(12) United States Patent
Zhang et al.

(10) Patent No.: US 11,632,152 B2
(45) Date of Patent: Apr. 18, 2023

(54) OVER-THE-AIR CALIBRATION FOR RECIPROCITY BASED UL MIMO TRANSMISSION

(71) Applicant: QUALCOMM Incorporated, San Diego, CA (US)

(72) Inventors: Yu Zhang, Beijing (CN); Chao Wei, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 952 days.

(21) Appl. No.: 16/468,243

(22) PCT Filed: Jan. 9, 2017

(86) PCT No.: PCT/CN2017/070617
§ 371 (c)(1),
(2) Date: Jun. 10, 2019

(87) PCT Pub. No.: WO2018/126473
PCT Pub. Date: Jul. 12, 2018

(65) Prior Publication Data
US 2020/0076483 A1    Mar. 5, 2020

(51) Int. Cl.
*H04W 24/08* (2009.01)
*H04B 7/0456* (2017.01)
*H04L 25/02* (2006.01)

(52) U.S. Cl.
CPC ......... *H04B 7/0456* (2013.01); *H04L 25/021* (2013.01); *H04W 24/08* (2013.01)

(58) Field of Classification Search
CPC .............. H04L 5/0048; H04L 25/0204; H04L 25/0224; H04L 25/0202; H04L 5/0023; H04L 1/0026; H04L 5/0069; H04L 25/0242; H04B 17/21; H04B 17/12; H04B 17/14; H04B 17/11; H04B 7/0617; H04B 7/024; H04B 17/309; H04B 7/0626; H04B 7/0413; H04W 24/08; H04W 24/02; H04W 88/08; H04W 24/00; H04W 24/10;
(Continued)

(56) References Cited

U.S. PATENT DOCUMENTS

| | | | |
|---|---|---|---|
| 8,867,495 B2 | 10/2014 | Farajidana et al. | |
| 11,108,442 B1 * | 8/2021 | Tian | ...... H04B 17/12 |
| 2005/0128953 A1 | 6/2005 | Wallace et al. | |

(Continued)

FOREIGN PATENT DOCUMENTS

| | | |
|---|---|---|
| CN | 102763345 A | 10/2012 |
| CN | 103731914 A | 4/2014 |

(Continued)

OTHER PUBLICATIONS

Supplementary European Search Report—EP17889819—Search Authority—The Hague—Jul. 22, 2020.

(Continued)

*Primary Examiner* — Eva Y Puente
(74) *Attorney, Agent, or Firm* — Qualcomm Incorporated

(57) ABSTRACT

Certain aspects of the present disclosure relate to methods and apparatus for performing one or more over the air calibration procedures for reciprocity based uplink MIMO transmissions, for example, in new radio (NR).

34 Claims, 14 Drawing Sheets

(58) Field of Classification Search
CPC ............... H04W 52/08; H04W 52/10; H04W 52/146; H04W 52/242
USPC ........................................................ 375/267
See application file for complete search history.

(56) References Cited

U.S. PATENT DOCUMENTS

| | | |
|---|---|---|
| 2007/0206504 A1 | 9/2007 | Koo et al. |
| 2008/0125109 A1 | 5/2008 | Larsson et al. |
| 2010/0117890 A1 | 5/2010 | Vook et al. |
| 2011/0170623 A1 | 7/2011 | Park et al. |
| 2014/0254401 A1 | 9/2014 | Talwar et al. |
| 2014/0269502 A1* | 9/2014 | Forenza ............... H04B 7/0626 370/328 |
| 2016/0308624 A1* | 10/2016 | Rong ..................... H04B 17/12 |
| 2017/0048009 A1* | 2/2017 | Sarkar ................. H04B 7/0628 |
| 2018/0097667 A1* | 4/2018 | Yoo ....................... H04B 17/14 |
| 2020/0076517 A1* | 3/2020 | Zhu ....................... H01Q 3/267 |
| 2020/0358506 A1* | 11/2020 | Akoum ................. H04B 17/24 |

FOREIGN PATENT DOCUMENTS

| | | |
|---|---|---|
| CN | 104168071 A | 11/2014 |
| CN | 104995851 A | 10/2015 |
| EP | 1551143 A1 | 7/2005 |
| WO | 2015139192 A1 | 9/2015 |
| WO | 2015188386 A1 | 12/2015 |

OTHER PUBLICATIONS

International Search Report and Written Opinion—PCT/CN2017/070617—ISA/EPO—Sep. 9, 2017.

* cited by examiner

OVER-THE-AIR CALIBRATION FOR RECIPROCITY BASED UL MIMO TRANSMISSION

CROSS-REFERENCE TO RELATED APPLICATION

This application is a national stage application under 35 U.S.C. § 371 of PCT/CN2017/070617, filed Jan. 9, 2017, which is assigned to the assignee hereof and hereby expressly incorporated by reference in its entirety.

FIELD

The present disclosure relates generally to communication systems, and more particularly, to methods and apparatus for performing over the air calibration for reciprocity based uplink multiple-input multiple-output (MIMO) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access ((FDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for performing an over the air calibration for wireless communications. The method may be performed, for example, by a user equipment (UE). The method generally includes sending a first reference signal (RS) to a device. The method also includes estimating a first channel from the device to the UE based on a second RS received from the device. The method further includes receiving, from the device, a representation of a second channel from the UE to the device determined based on the first RS. The method further includes performing a calibration for a transmission to the device based in part on the first channel estimate and the representation of the second channel.

Certain aspects of the present disclosure generally relate to methods and apparatus for performing an over the air calibration for wireless communications. The method may be performed, for example, by a base station (BS). The method generally includes receiving a first reference signal (RS) from a first user equipment (UE). The method also includes estimating an uplink channel between the first UE and the BS based on the first RS. The method further includes determining a representation of the uplink channel based on the uplink channel estimate. The method further includes sending the representation of the uplink channel to the first UE to assist the first UE in calibrating a transmission to the BS.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
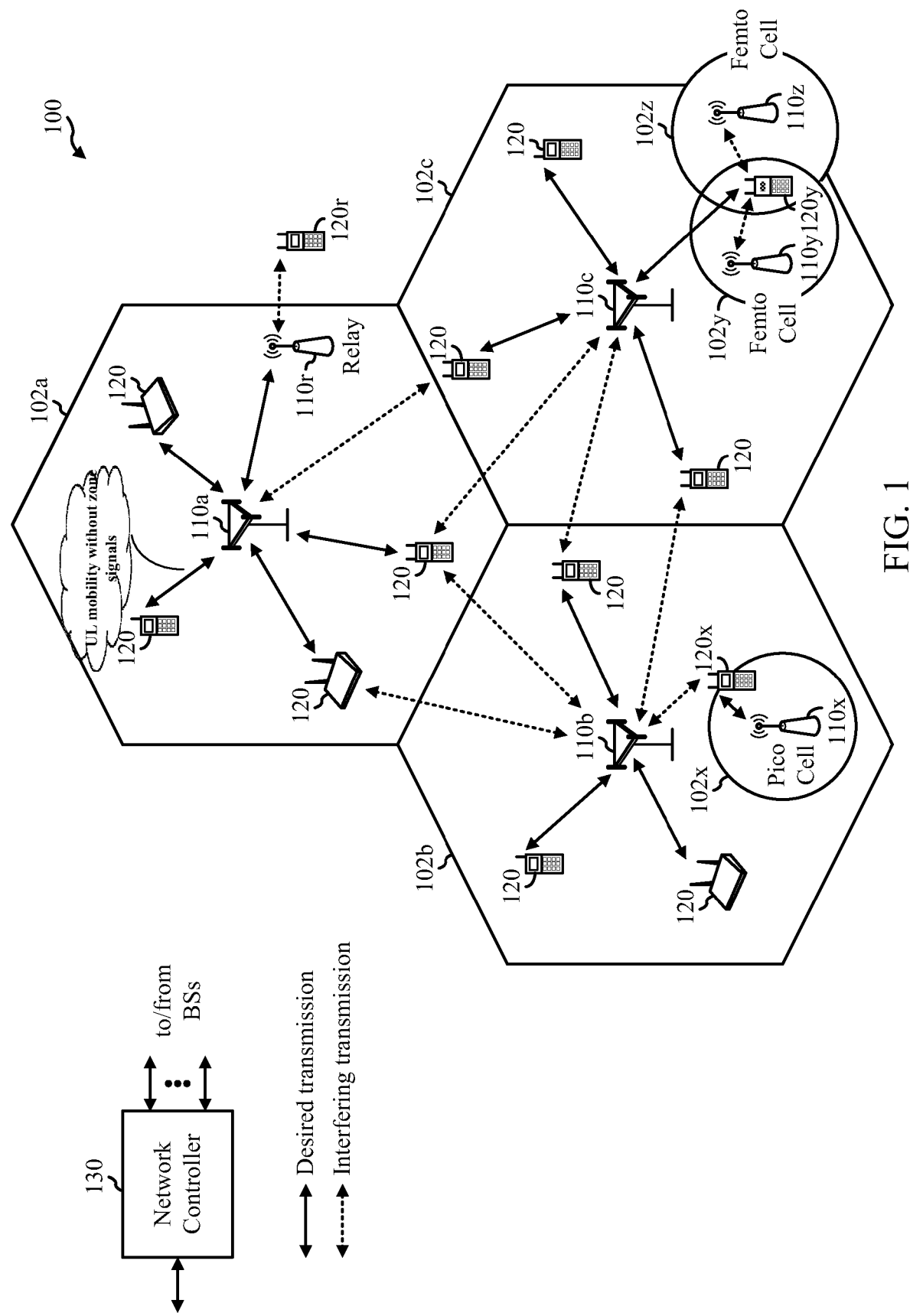
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to performing an over the air calibration for wireless communications (e.g., uplink MIMO transmission(s)). In particular, aspects provide techniques for a network-based over the air (OTA) calibration procedure, device-to-device (D2D) based OTA calibration procedure, and a network-assisted D2D based UE OTA calibration procedure.

In some aspects, a UE may send a first reference signal (RS) to a device. The device may be a UE or a network (e.g., a network entity, such as a BS). The UE may estimate a first channel from the device to the UE based on a second RS received from the device. The device may determine a representation of a second channel from the UE to the device based on the first RS received from the UE, and send the representation of the second channel to the UE. Once received, the UE may perform a calibration for a transmission to the device based in part on the first channel estimate and the representation of the second channel.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E, UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be used, for example, for performing one or more OTA calibration procedures for reciprocity based UL MIMO transmissions, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR. BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies, A RAT may also be referred to as a radio technology, an air interface, etc. A frequency may also be referred to as a carrier, a frequency channel, etc. Each frequency may support a single RAT in a given geographic area in order to avoid interference between wireless networks of different RATS. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r, A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz), Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LIE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ins duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL, data as well as DU/UL control data. EL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per LIE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
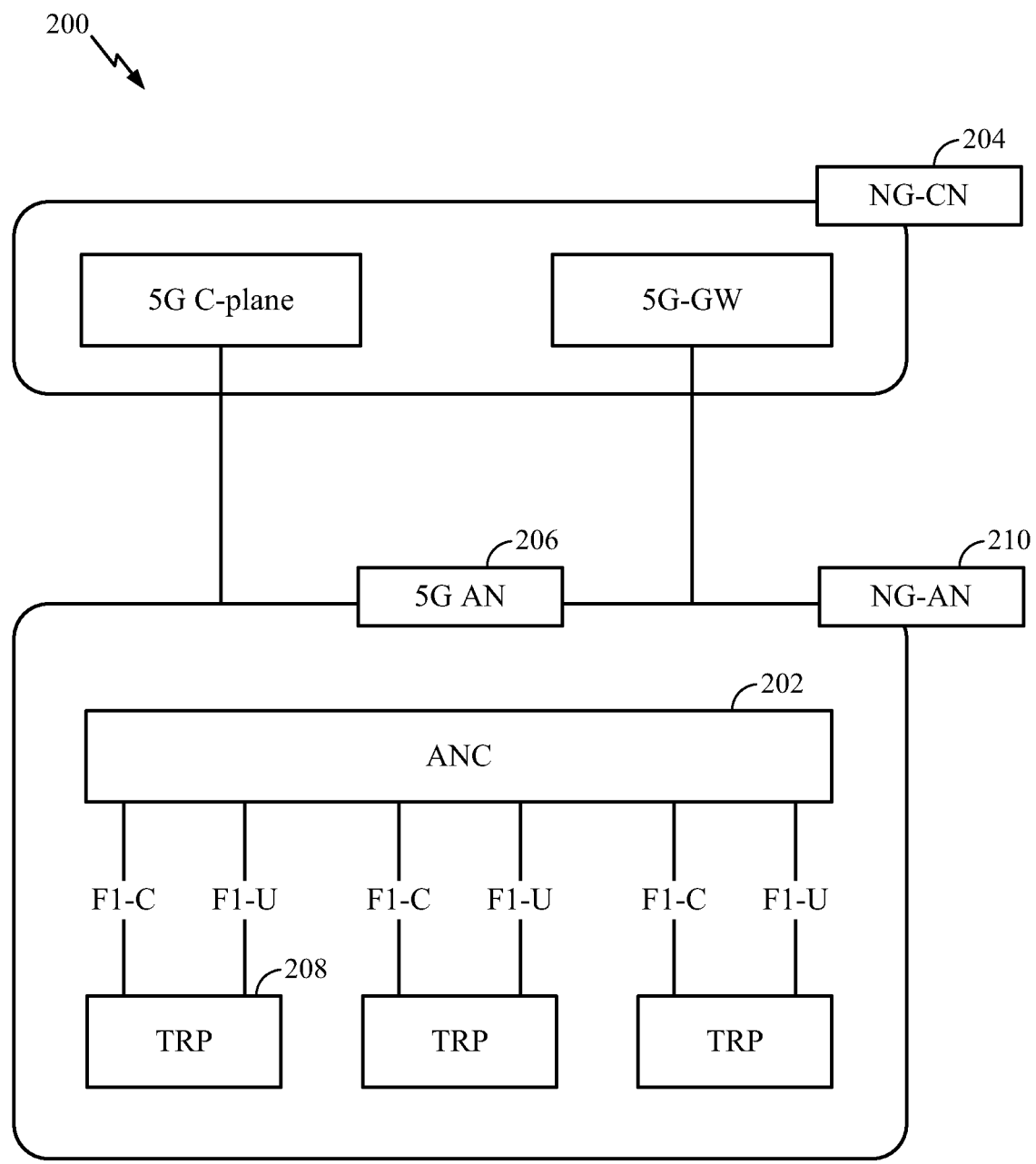
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated), For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data. Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
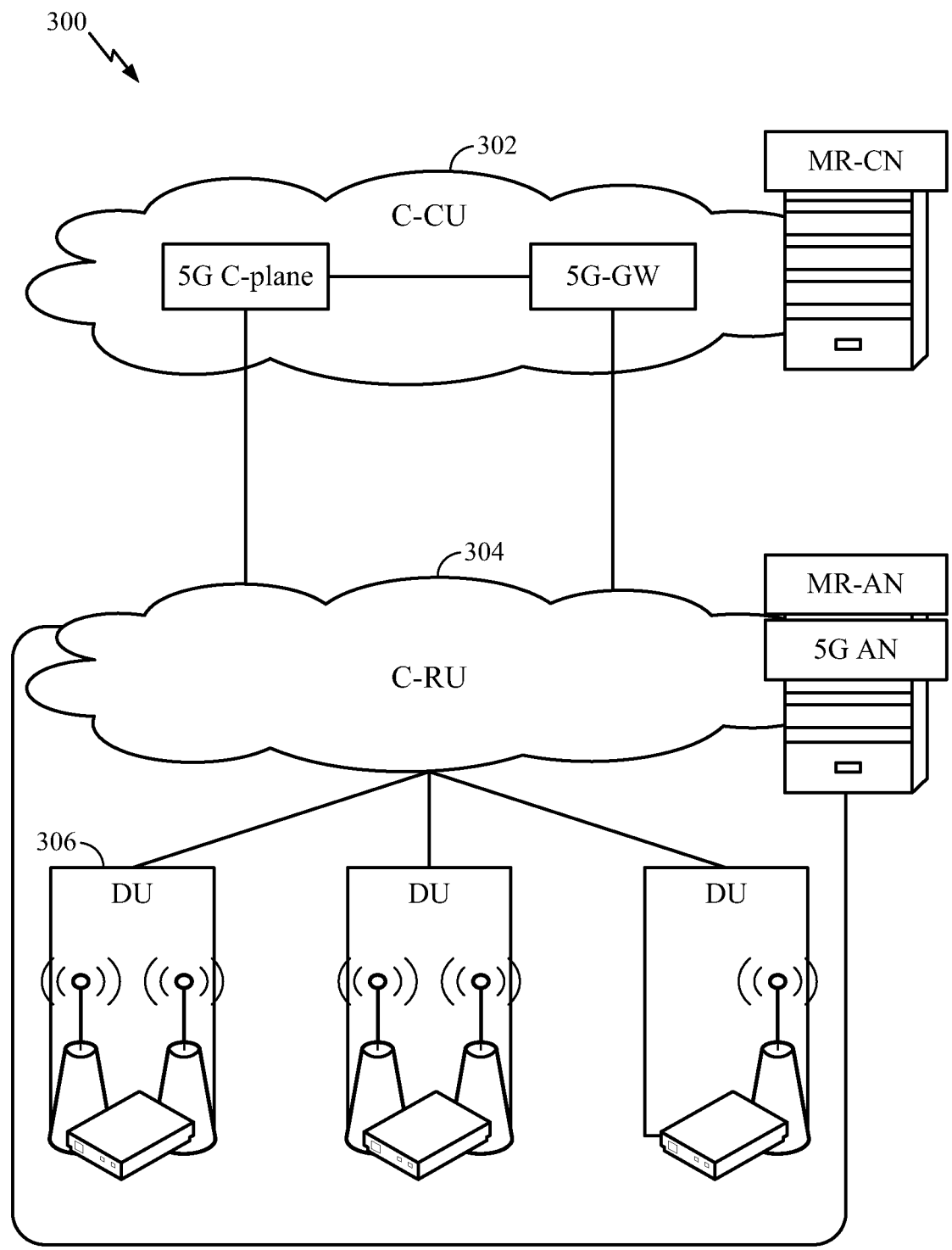
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
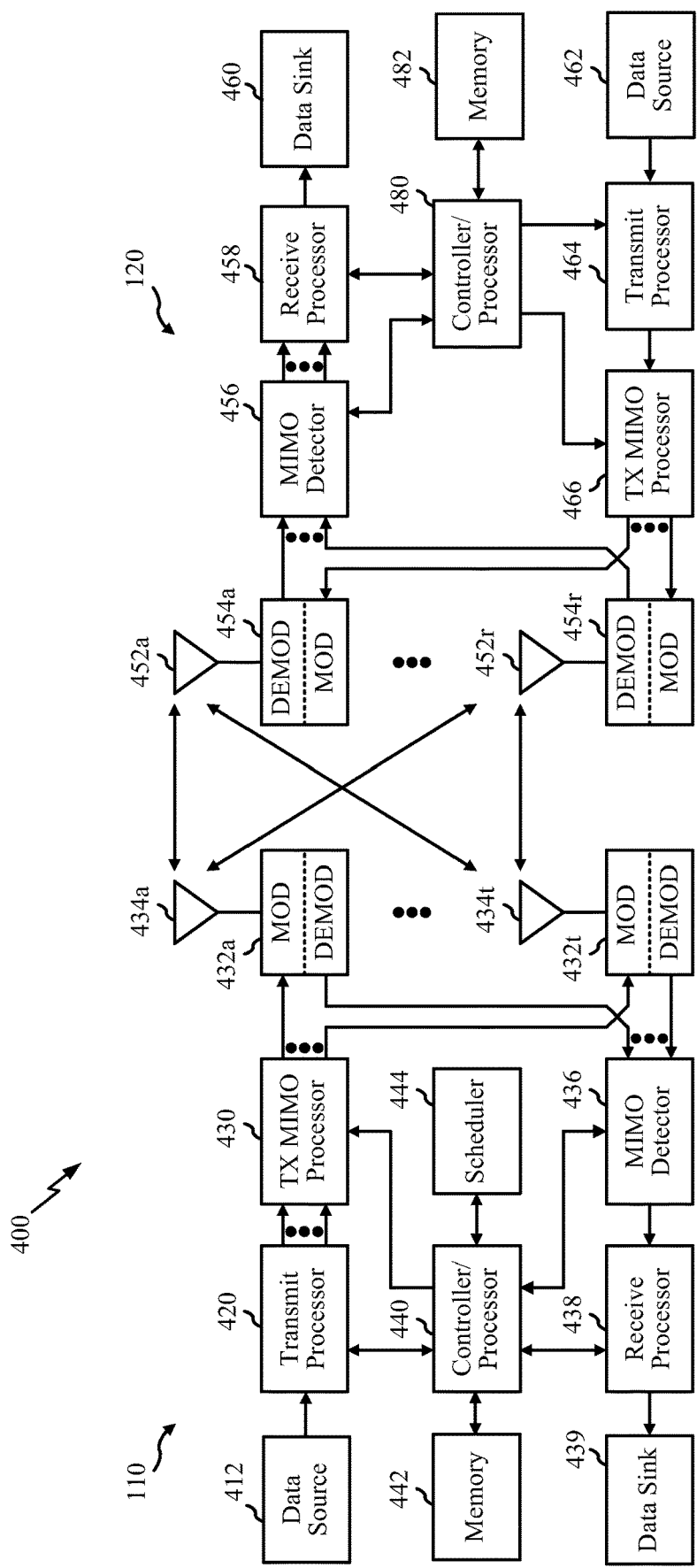
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 10-14.

FIG. 4 shows a block diagram of a design of a BS 110 and a UE 120, which may be one of the BSs and one of the UEs in FIG. 1, For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120, The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 11, and/or other processes for the techniques described herein (e.g., with reference to FIGS. 12-14). The processor 480 and/or other processors and modules at the UE 120 may also perform or direct, e.g., the execution of the functional blocks illustrated in FIG. 10, and/other processes for the techniques described herein (e.g., with reference to FIGS. 12-14). The memories 442 and 482 may store data and program codes for the BS 110 and the UE 120, respectively. A scheduler 444 may schedule UEs for data transmission on the downlink and/or uplink.

Figure 5:
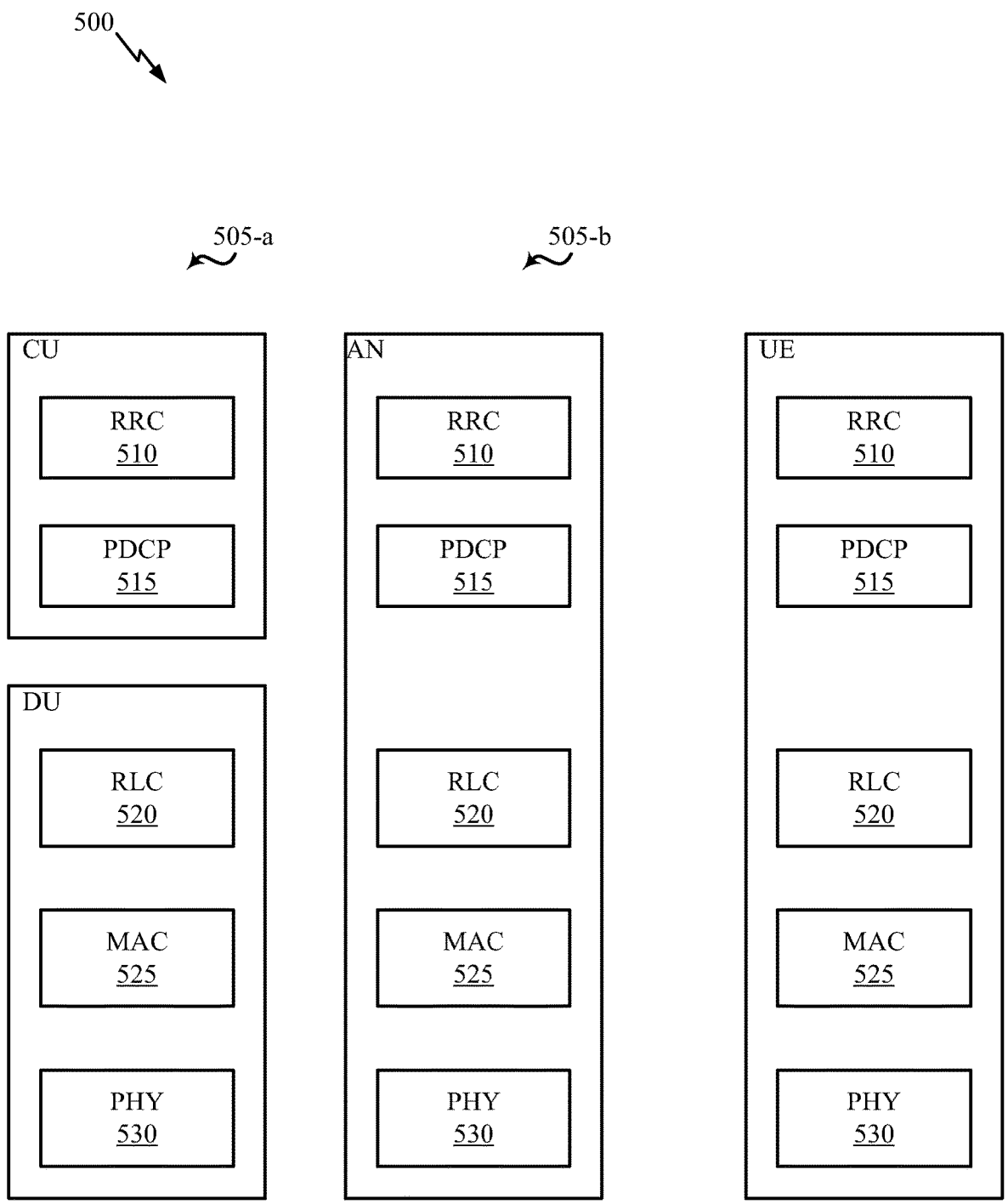
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
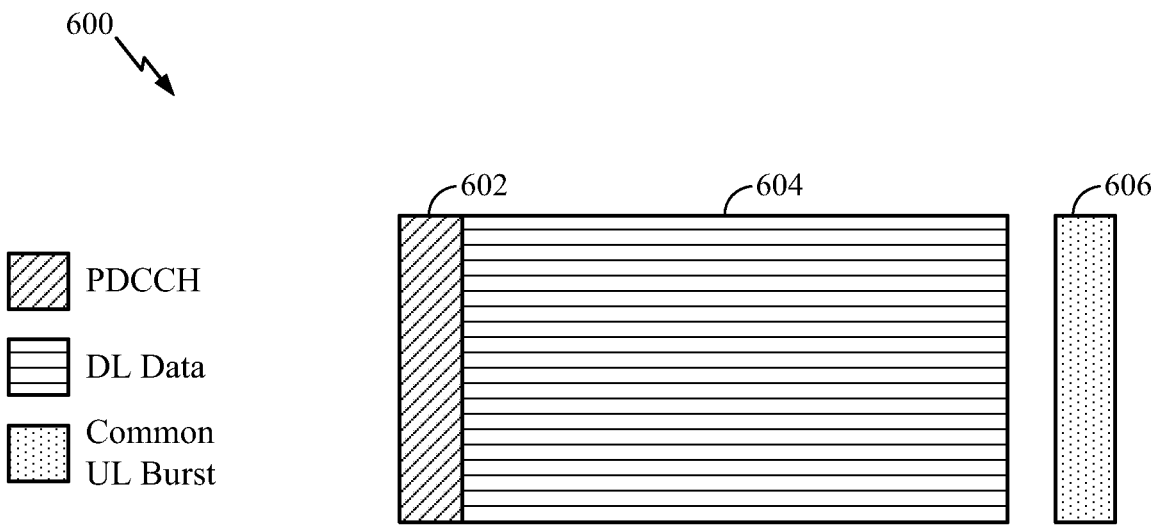
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a HACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
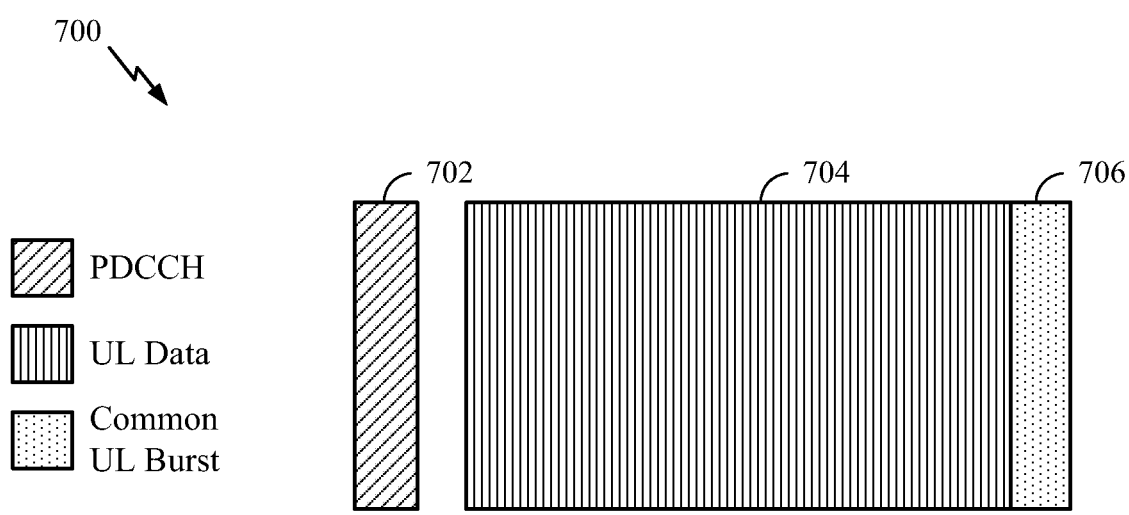
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Over the Air Calibration for Reciprocity Based UL MIMO Transmission

Certain communication systems (e.g., such as NR) may support one or more techniques for uplink MIMO communications. For example, for UL MIMO transmissions, NR may support at least one of a codebook-based UL MIMO transmission or reciprocity-based UL MIMO transmission.

Figure 8A:
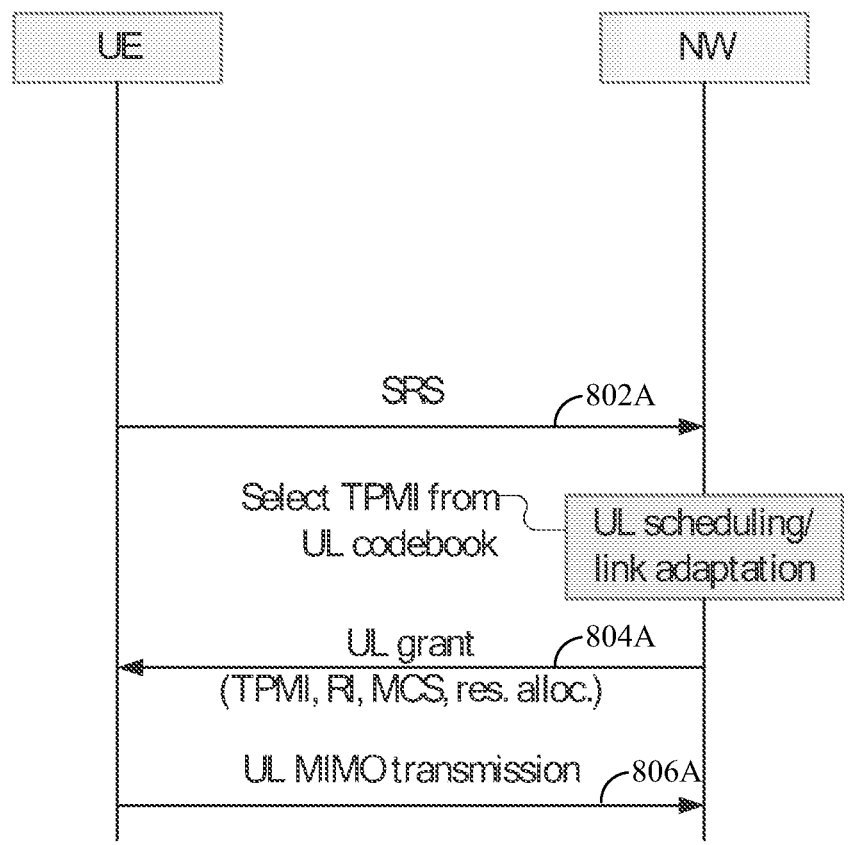
FIG. 8A illustrates an example flow for a codebook-based UL transmission, in accordance with certain aspects of the present disclosure.

FIG. 8A illustrates one example flow for a codebook-based UL MIMO transmission, according to certain aspects of the present disclosure. As shown, at 802A, the UE may send a sounding reference signal (SRS) to a network entity (e.g., a BS). Once received, the network entity may perform an UL scheduling/link adaptation procedure based on the SRS. That is, the network entity may use the SRS to determine an estimate of the uplink channel from the UE to the network entity. As part of the UL scheduling, the network entity may select a transmit precoding matrix indicator (TPMI) to identify a precoding matrix from a codebook. The BS may refer to a UL codebook of precoding matrices when selecting the TMPI.

At 804A, the network entity may provide a UL grant to the UE that includes the TPMI, rank indication (RI), modulation and coding scheme (MCS), a set of time and frequency resources, etc., for the UE to use for a transmission to the network entity. In response to receiving the UL grant, the UE may transmit a signal (e.g., UL MIMO transmission) to the network entity on the indicated time and frequency resources using a precoding matrix indicated by the TMPI (806A). For example, the UE may refer to a similar uplink codebook of precoding matrices to determine which precoding matrix is indicated by the TMPI.

In some cases, however, a codebook-based approach may not be ideal for UL MIMO transmission in certain systems (e.g., such as NR). For example, the codebook-based transmission may provide limited precoding gain due in part to the UL codebook size. Additionally, codebook-based subband UL precoding may be difficult to support due in part to the increased downlink control information (DCI) overhead for subband PMI indication.

Figure 8B:
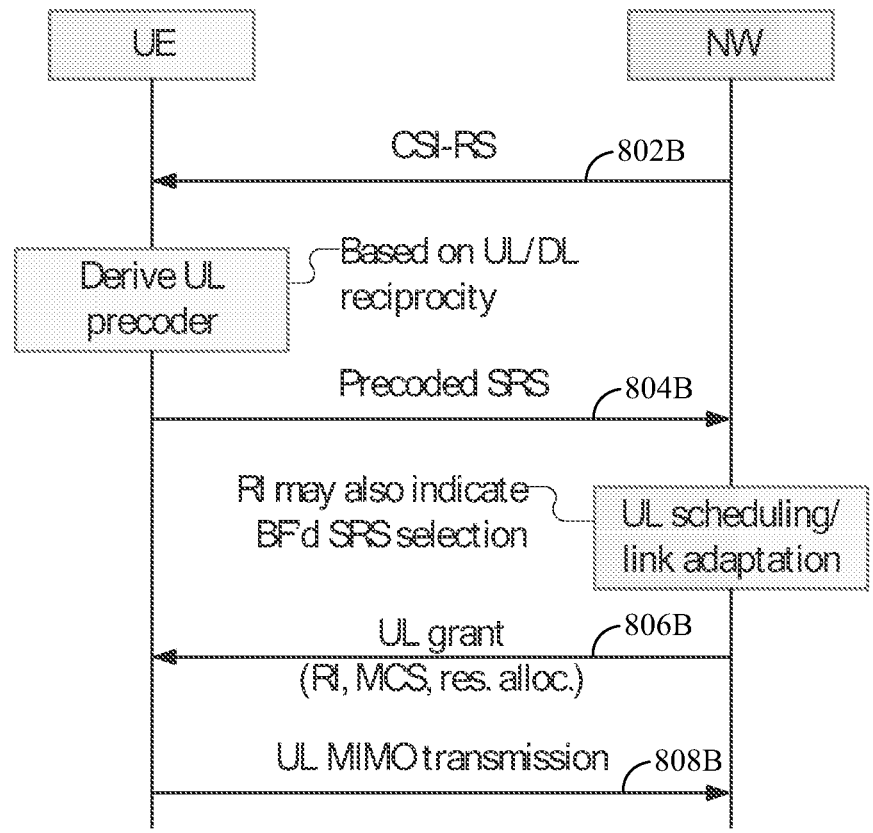
FIG. 8B illustrates an example flow for a reciprocity-based UL MIMO transmission, in accordance with certain aspects of the present disclosure.

FIG. 8B illustrates one example flow for a reciprocity-based VU MIMO transmission, according to certain aspects of the present disclosure.

As shown, at 802B, the network entity (e.g., a BS) transmits a channel state information reference signal (CSI-RS) to the UE. The UE may estimate the downlink channel from the network entity to the UE based on the CSI-RS and derive a UL precoding matrix to use for transmissions to the network entity based on the downlink channel estimate. For example, the UE may assume that the uplink channel is reciprocal to the downlink channel, and, based on the UL/DL reciprocity assumption and the received CSI-RS, derive the UL precoding matrix. In one example, the UE may perform a matrix decomposition, such as singular value decomposition (SVD), to calculate the UL precoding matrix.

At 804B, the UE sends a precoded SRS transmission (e.g., one or more precoded SRS ports) to the network entity. In one example, the UE may send the precoded SRS transmission in a subband manner. The network entity may perform an UL scheduling/link adaptation procedure based on the precoded SRS, for example, to determine the rank indication for the uplink transmission. In some examples, the rank indication may also indicate the beamformed SRS selection. At 806B, the network entity provides an UL grant to the UE for the UE to use for the uplink transmission. The UL grant may include the determined rank indication. MCS, and/or a resource allocation (e.g., set of time/frequency resources) for the uplink transmission. At 808B, the UE may transmit a signal (e.g., UL MIMO transmission) to the network entity on the indicated time and frequency resources using the precoding matrix derived from the received CSI-RS.

Compared to the codebook-based approach, the reciprocity-based approach (e.g., illustrated in FIG. 8B) for UL MIME) transmissions may take advantage of precoded UL sounding to perform UL link adaptation and may support subband UL precoding with a negligible footprint in DCI. However, the UE may have to perform a calibration procedure in order to exploit the reciprocal based approach. For example, as shown in FIG. 8B, the UE derives the UL precoding matrix from the DL channel estimation (based on the CSI-RS) using reciprocity assumptions for the DL/UL, channel. However, while the radio propagation channel may be reciprocal (e.g., the downlink channel is the same as the uplink channel), there may be a mismatch between the UL and DL RF chains connected to the same antenna.

Figure 9:
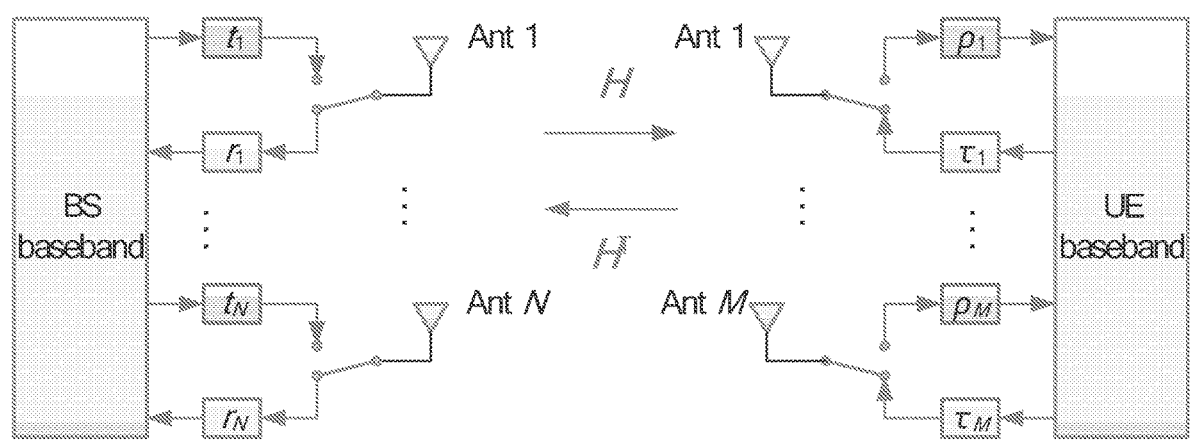
FIG. 9 illustrates an example of reciprocity assumptions may be affected by radio frequency (RF) chains of a device, in accordance with certain aspects of the present disclosure.

For example, with reference to FIG. 9, the radio propagation channel from the BS to the UE may be reciprocal to the radio propagation channel from the UE to the BS (i.e., $H=H^T$). However, while $H=H^T$, there may be a mismatch between the UL/DL RF chains connected to the same antenna at the UE/BS (e.g., for the UE, $\tau_m \neq \rho_m$, where m=# of antennas at the UE). As a result, the UL/DL channels "seen" by the BS/UE may not be reciprocal. For example, the UL channel from the BS's perspective may be $H_{UL}=R_{BS} \cdot H^T \cdot T_{UE}$, whereas the DL channel from the UE's perspective may be $H_{DL}=R_{UE} \cdot H \cdot T_{BS}$, where $R_{BS}$ diag $(r_1, \ldots, r_N)$, $T_{UE}$=diag $(\tau_1, \ldots, \tau_M)$, $R_{UE}$=diag $(\rho_1, \ldots, \rho_m)$, and $T_{BS}$=diag $(t_1, \ldots t_N)$.

Thus, in order to exploit channel reciprocity in UL MIMO transmission, the UE may have to adjust the complex gain of each RF chain, such that the UL channel can be obtained via DL channel estimation. In particular, in some aspects, to account for the mismatch between the UL/DL RF chains, the UE may perform a reciprocity calibration to adjust the complex gain of each TX (or RX) RF chain, such that the UL/DL channels "seen" by BS/UE are reciprocal. For example, the UE may determine a calibration matrix A=diag $(a_1, \ldots, a_N)$ such that the calibrated channel $\tilde{H}_{UL}=H_{DL}^T A$, based on DL channel estimation $H_{DL}$, is equivalent to the UL channel seen by the BS. The equivalency means that the calibrated channel $\tilde{H}_{UL}$ can be used to determine the UL precoding matrix, for example, $\tilde{H}_{UL} \approx H_{UL}$ or $\tilde{H}_{UL}^H \tilde{H}_{UL} \approx H_{UL}^H H_{UL}$.

In one aspect, the UE may perform a self-calibration procedure to adjust the complex gain of each RF chain. The self-calibration procedure may involve using additional hardware to implement a reference antenna (or RF chain) (e.g., at the UE) to provide reference signals to achieve a reciprocal UL MIMO transmission using DL channel estimation. Such self-calibration procedure may be similar to the calibration procedure employed by a TDD BS to achieve a reciprocal DL MIMO transmission using UL channel estimation. However, using a self-calibration procedure at the UE side may not be ideal, as UEs may be more sensitive to cost increases and/or form factor changes due in part to the additional hardware needed to implement the self-calibration procedure.

In another aspect, the UE may perform an over the air (OTA) calibration to adjust the complex gain of each RF chain. In one example, antennas from the base station (or another device), and not new hardware, may provide the reference signal. While the OTA calibration approach may not use any additional hardware to implement the calibration procedure by the UE, current techniques for OTA calibration may use complex, dedicated physical layer procedures, which may not be supported by current standards. Thus, an improved OTA calibration procedure for reciprocity based UL MIMO transmission in NR may be desirable.

As described in more detail below, aspects presented herein provide techniques for a network-based OTA calibration procedure, D2D based OTA calibration procedure, and a network-assisted D2D based UE OTA calibration.

Figure 10:
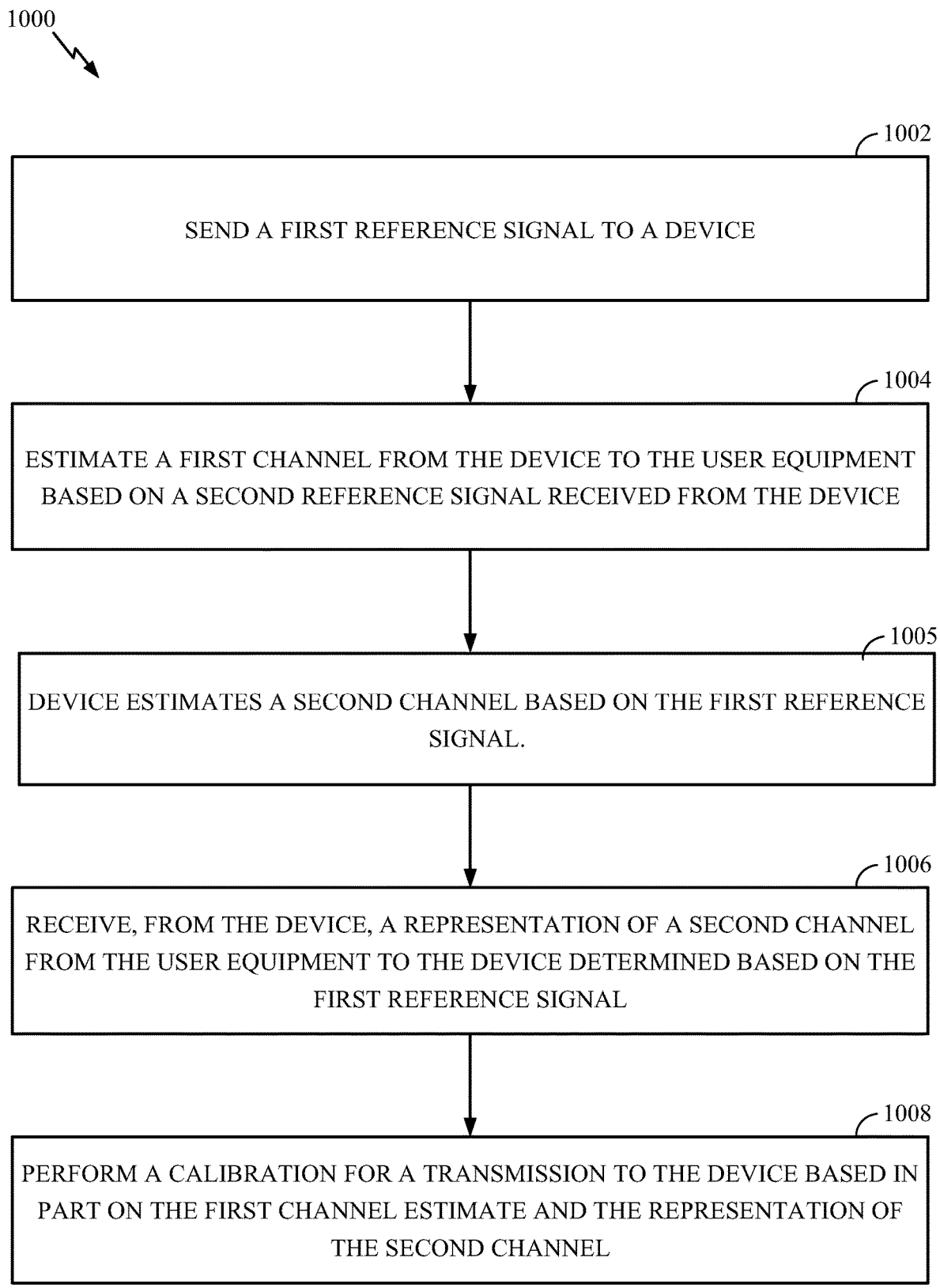
FIG. 10 example operations for wireless communications that may be performed by a user equipment, in accordance with aspects of the present disclosure.

FIG. 10 illustrates example operations 1000 for wireless communications, for example, for performing an OTA calibration for wireless communications (e.g., an uplink MIMO transmission). According to certain aspects, operations 1000 may be performed by a user equipment (e.g., such as UE 120).

Operations 1000 begin at 1002 where the LIE sends a first RS (e.g., UL SRS) to a device (e.g., a BS, another UE, etc.). The UE may also send a calibration request to the device. At 1004, the LIE estimates a first channel (e.g., a DL) from the device to the UE based on a second RS (e.g., DL CSI-RS, SRS from another UE, etc.) received from the device. At 1005, the device estimates a second channel (e.g., an UL) based on the first RS. At 1006, the UE receives, from the device, a representation of a second channel from the UE to the device determined (e.g., by the device) based on the first RS.

At 1008, the UE performs a calibration for a transmission to the device based in part on the first channel estimate and the representation of the second channel from the UE to the device. In one aspect, the UE may perform the calibration by determining a calibration matrix based on the first channel estimate and the representation of the second channel, and determining a calibrated estimate of the second channel based on the calibration matrix. In one aspect, the UE may send a transmission to the device based on the calibrated estimate of the second channel. That is, the UE may determine a precoding UL precoding) to use for the transmission based in part on the calibrated estimate of the second channel. In one example, the UE can compute a calibration matrix based on observation of both the first and second (or DL, and UL) channels and apply the calibration matrix to its UL transmission estimate.

Figure 11:
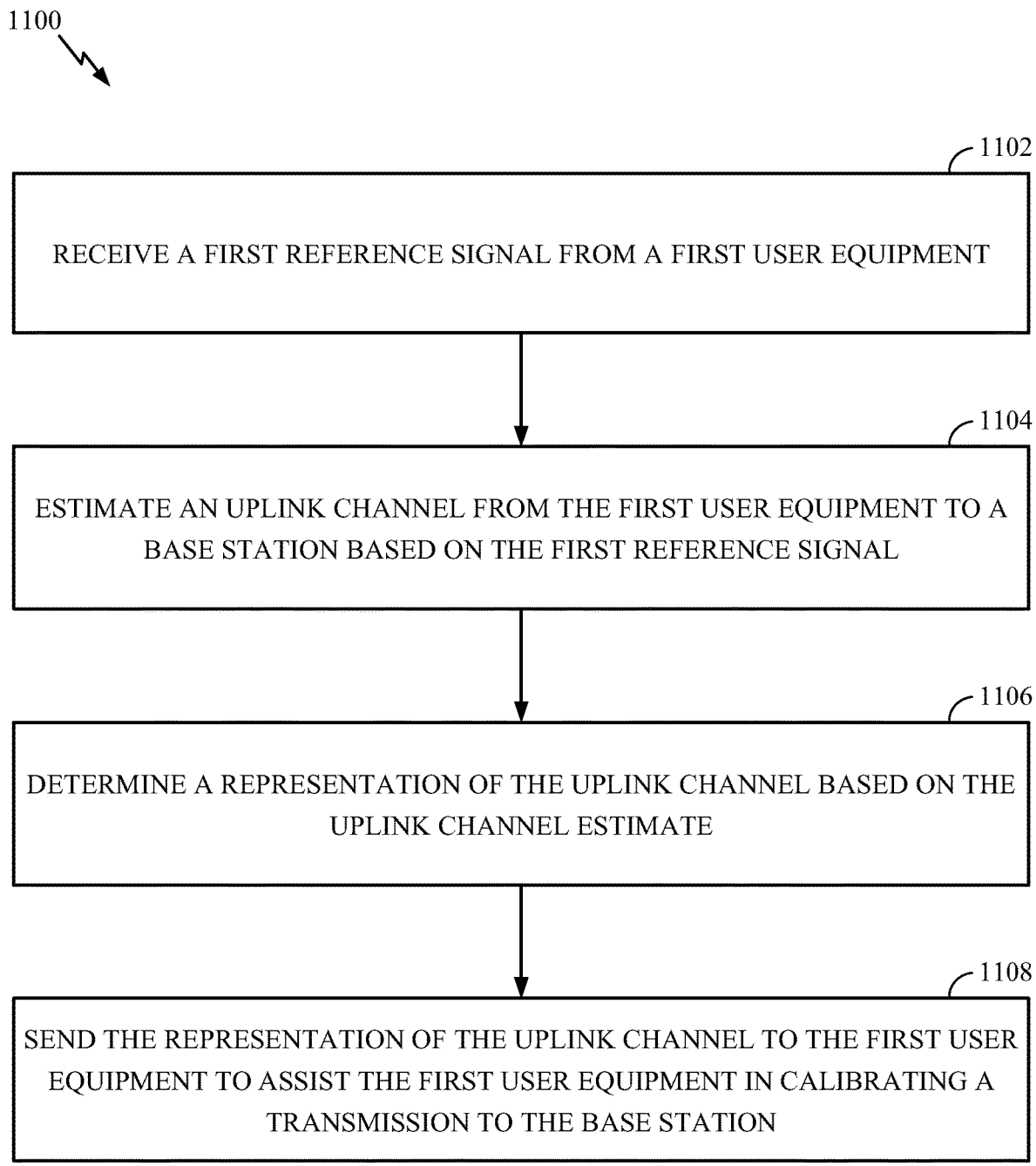
FIG. 11 example operations for wireless communications that may be performed by a base station, in accordance with aspects of the present disclosure.

FIG. 11 illustrates example operations 1100 for wireless communications, for example, for performing an OTA calibration for wireless communications (e.g., an uplink MIMO transmission). According to certain aspects, operations 1100 may be performed by a BS (e.g., a network entity, such as BS 110).

Operations 1100 begin at 1102 where the BS receives a first RS from a first UE. At 1104, the BS estimates an uplink channel from the first UE to the BS based on the first RS. At 1106, the BS determines a representation of the uplink channel based on the uplink channel estimate. At 1108, the BS sends the representation of the uplink channel to the first UE to assist the first UE in calibrating a transmission to the BS.

Figure 12:
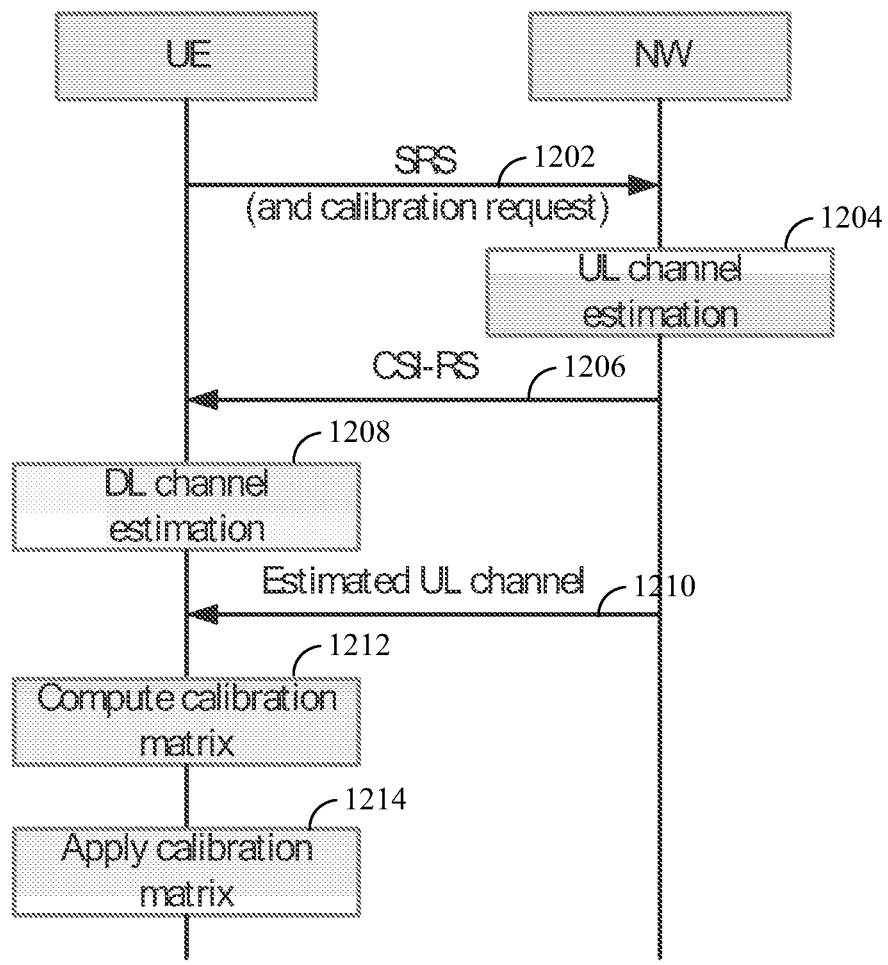
FIGS. 12-14 illustrate example flows for over the air (OTA) calibration techniques for reciprocity based uplink communications, in accordance with aspects of the present disclosure.

According to certain aspects, techniques presented herein provide a network-based reciprocity calibration procedure (e.g., as illustrated in FIG. 12) between a UE and a device (e.g., a network entity, such as a BS).

Referring to FIG. 12, at 1202, the UE sends a SRS (e.g., first RS) to the BS. In some aspects, the UE may also transmit a calibration request to the BS. In some aspects, the SRS may indicate a calibration request. The calibration request may indicate a request for assistance in calibrating a transmission from the UE to the BS. In response to the calibration request and/or SRS, the BS may decide to perform one or more of operations 1204, 1206 and 1210. At 1204, the BS estimates the UL channel ($\hat{H}_{UL}$) based on the SRS. At 1206, the BS sends a CSI-RS (e.g., second RS) to the UE. At 1208, the UE, may measure the CSI-RS and estimate the DL channel ($\hat{H}_{DL}$) based on the CSI-RS. At 1210, the BS sends a representation G of the estimated UL channel ($\hat{H}_{UL}$) to the UE, where $G=f(\hat{H}_{UL})$. At 1212, the UE computes the calibration matrix (A) based on G and $\hat{H}_{UL}$. At 1214, the UE applies the calibration matrix (A), for example, to determine a calibrated estimate of the UL channel (i.e., $\hat{H}_{UL}=\hat{H}_{DL}*A$).

In one aspect, the BS may trigger the UE to initialize the calibration procedure (e.g., by sending the calibration request) based on one or more performance metrics. For example, if the BS determines, based on one or more signal quality measurements, that a quality of the UL transmission is below a predefined threshold, the UE may trigger the UE to send the calibration request.

In one aspect, the calibration request may be transmitted (e.g., by the UE) as part of uplink control information (UCI). In one example, the request may comprise a single bit indication within the UCI. In another example, the request may comprise multiple bits within the DCI. The UCI transmission can be periodic, aperiodic, or semi-persistent. The UE, for example, can be configured with the reporting settings for UCI via layer 1 (L1) (e.g., DCI), layer 2 (e.g., MAC CE), and/or higher-layer e.g., RRC) signaling.

In one aspect, the calibration request may be transmitted using a dedicated physical uplink control channel (PUCCH) resource. For example, the dedicated resource may be similar to PUCCH format 1 in LTE for UL scheduling request. The UE may be configured with the dedicated. PUCCH resource that has a certain periodicity and/or slot offset. The UE may send the calibration request at the time instance associated with the configured PUCCH resource. In some cases, the calibration request may be jointly encoded with the scheduling request, UL HARQ ACK/NACK, etc.

In one aspect, the UE may signal the calibration request implicitly with SRS (e.g., the first RS). For example, the UE may be configured with multiple types of SRS sequences. One of the sequences may be used for normal LT sounding (e.g., w/o calibration request). Another of the sequences may be used to signal a calibration request. The BS, in turn, upon detecting the particular SRS sequence associated with a calibration request may determine to assist the UE in the calibration procedure.

In some aspects, the representation (G) of the UL channel (e.g., second channel) estimate may be a subset of the full UL channel. Put differently, G may be equal to $P \cdot \hat{H}_{UL}$, where P is a row selection matrix. For example, for a BS (e.g., gNB) with 8 antennas and a UE with 4 SRS ports, the BS may estimate the full uplink channel as an 8×4 UL channel $\hat{H}_{UL}$. In this example, however, the BS may decide to just send the first few (e.g., 4) rows of $\hat{H}_{UL}$ and not the whole matrix. In some aspects, the selection matrix P may or may not be transparent to the UE.

In some aspects, the representation (G) of the UL channel (e.g., second channel) estimate may be an estimate of the UL transmit covariance matrix, e.g., $\hat{R}_{UL} \approx \mathbb{E}\{H_{UL}{}^H H_{UL}\}$. In some aspects, the representation (G) of the UL channel estimate may include one or more eigenvectors and/or eigenvalues of the UL channel estimate ($\hat{H}_{UL}$) or the UL transmit covariance matrix ($\hat{R}_{UL}$).

In some aspects, the representation of the UL channel may be transmitted via a dedicated DL control channel. In one example, the DL control channel may be similar to enhanced physical downlink control channel (EPDCCH) in LIE). In some aspects, the representation of the UL channel may be transmitted via a physical downlink shared channel (e.g., PDSCH). In some aspects, the representation of the UL channel may be multiplexed with one or more downlink shared channel transport blocks (e.g., PDSCH with multiplexing with DL-SCI transport block). In the case of MIMO transmission, the EL channel representation may be mapped to all layers, or to some layers like the layers to which the codeword with the highest MCS is mapped.

In some aspects, the BS may send the representation of the uplink channel by mapping the representation of the uplink channel into a sequence of bits, mapping the sequence of bits onto one or more symbols, and sending each of the one or more symbols on a set of resources allocated for sending the representation of the uplink channel. In one reference example, the representation of the uplink channel may be mapped to quadrature amplitude modulation (QAM) symbols on allocated REs from an encoded bit sequence. In one aspect, the mapping of the representation of the uplink channel to the sequence of bits can be performed using element-wise quantization. In one aspect, the mapping can be performed using dimension reduction representation with a predefined codebook and element-wise quantization. For example, assuming $G=f(\hat{H}_{UL})$ presented by $W_1 W_2$, $W_1$ may be selected from a predefined codebook, each entry in $W_2$ may be quantized separately, and the index of $W_1$ in the codebook and each quantized entry in $W_2$ may be sent to the UE.

In some aspects, the BS may send the representation of the uplink channel by modulating a set of resources allocated for sending the representation of the uplink channel with one or more coefficients of the uplink channel representation. For example, assuming $G=f(\hat{H}_{UL})=(g_{mn})_{M \times N}$, at least M×N REs may be allocated for its transmission to the UE. In this example, the transmitted waveform may be $\Sigma_k g_{mn} e^{-j2\pi f_k t}$, where $f_k$ is the frequency of the kth RE. The kth RE may be modulated with the m, n entry.

As mentioned above, the UE may compute a calibration matrix (A) based on G and $\hat{H}_{UL}$. In one aspect, the computation may include performing a least squares method or minimizing the distance between the calibrated channel covariance and the UL covariance matrix. For example, the UE may compute the calibration matrix by solving at least one of the following optimization problems (1)-(2):

$\min_A \|\hat{H}_{DL}{}^T A - H_{UL}(G)\|^2$, wherein $H_{UL}(G)$ is the UL channel recovered from G (1)

$\min_A d((\hat{H}_{DL}{}^T A)^H (\hat{H}_{DL}{}^T A), R_{UL}(G))$, where $R_{UL}(G)$ is the UL covariance matrix recovered from G, and d(•,•) is a distance between two Grain matrices (2)

Figure 13:
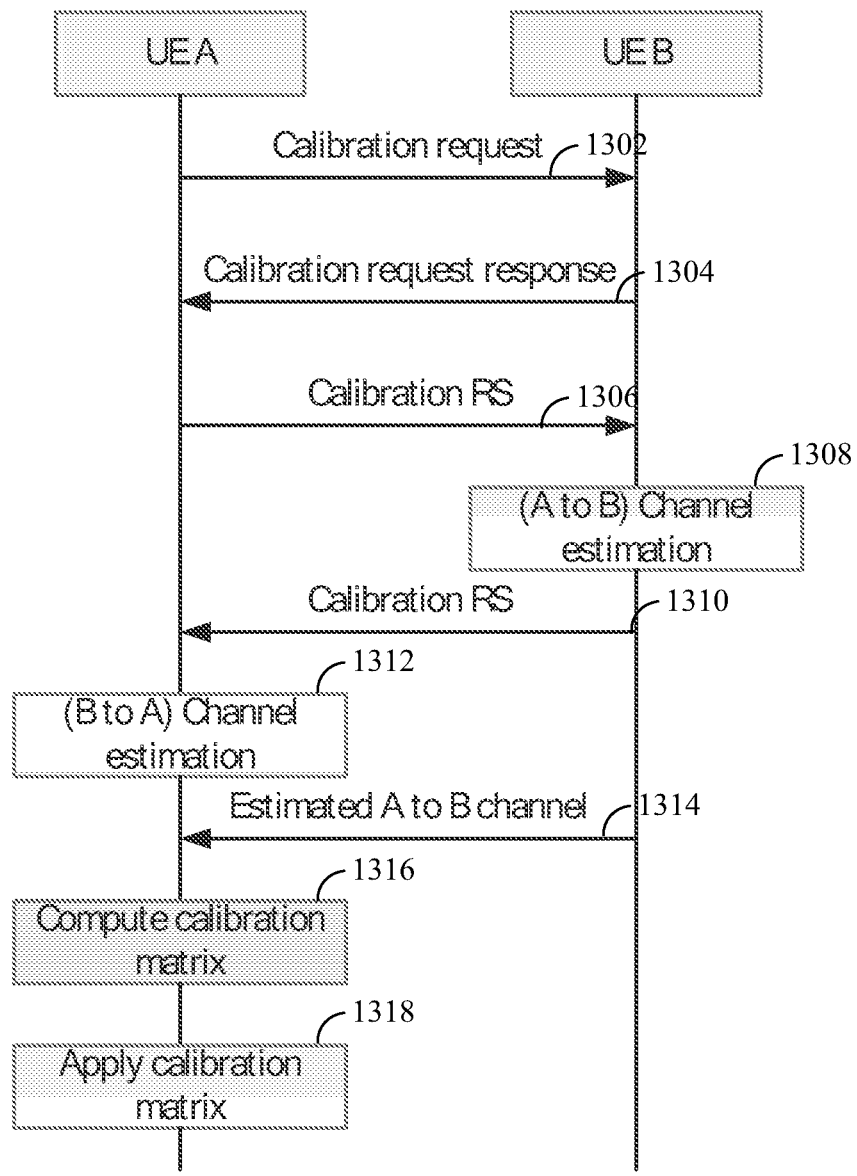

According to certain aspects, techniques presented herein provide a device to device (D2D) based reciprocity calibration procedure (e.g., as illustrated in FIG. 13) between a UE and a device (e.g., another UE).

Referring to FIG. 13, at 1302, UE A broadcasts a calibration request to one or more neighbor UEs (e.g., such as UE B). Once received, the neighbor UEs that decide to assist UE A may send a calibration request response to UE A. For example, as shown at 1304, UE B may send a calibration request response to UE A. At 1306, UE A sends a calibration RS (e.g., first RS) to UE B. The calibration RS may include a SRS or another type of RS. At 1308, UE B plays the role of the network and estimates the side-link channel ($\hat{H}_{AB}$) based on the calibration RS from UE A. At 1310, UE B sends a calibration RS (e.g., second RS) to UE A. At 1312, UE A estimates side-link channel ($\hat{H}_{BA}$) based on the calibration RS from UE B. At 1314, UE B sends a representation of $\hat{H}_{AB}$ ($G=f(\hat{H}_{AB})$) to UE A. At 1316, UE A computes a calibration matrix (A) based on G and $\hat{H}_{BA}$. At 1318, UE A applies the calibration matrix.

Figure 14:
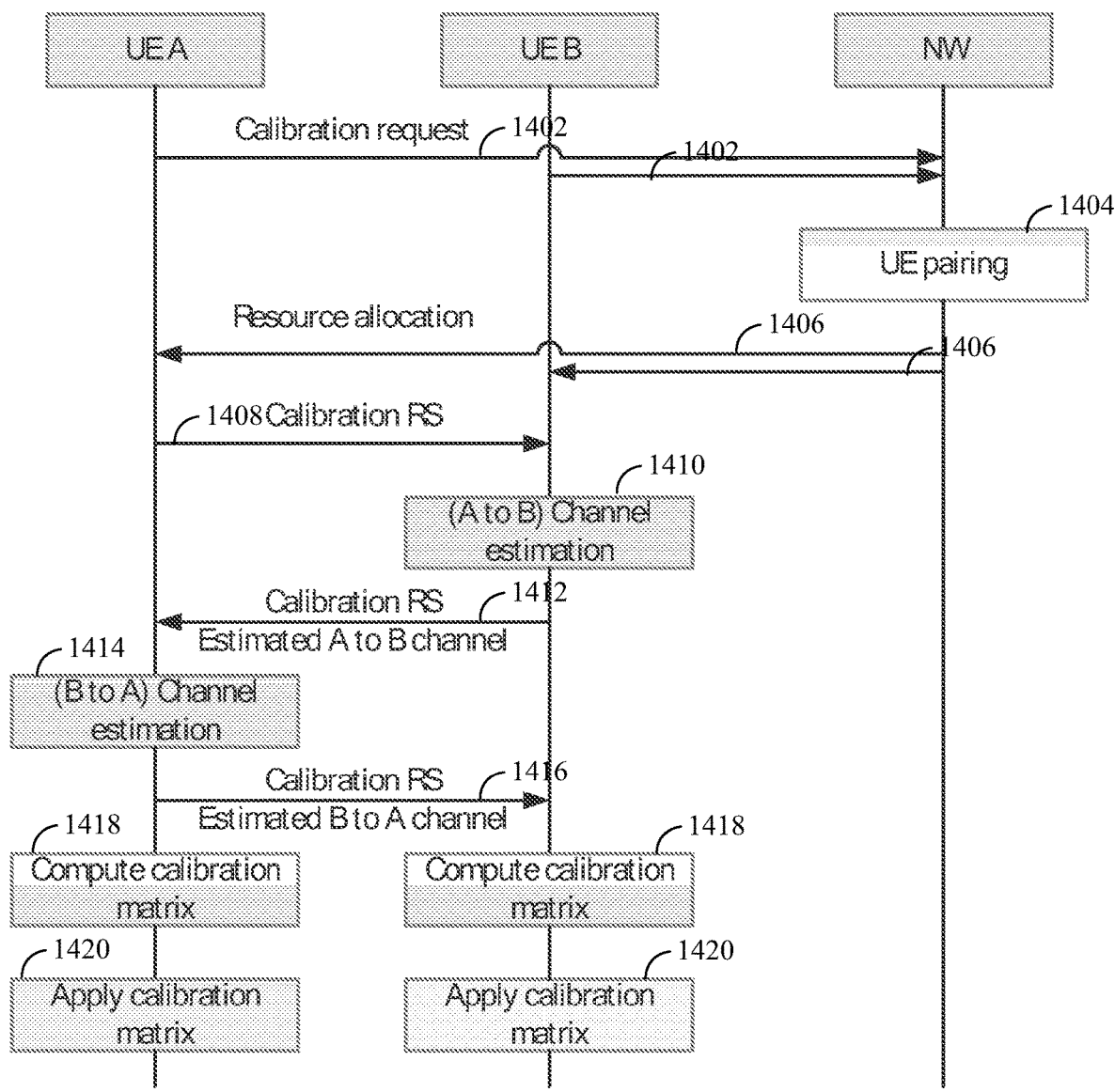

According to certain aspects, techniques presented herein provide a network-assisted D2D based reciprocity calibration procedure (e.g., as illustrated in FIG. 14) between a UE and one or more devices (e.g., one or more UEs).

Referring to FIG. 14, at 1402, multiple UEs (e.g., UE A and UE B) each send a calibration request to a base station (e.g., network entity). Upon receiving the calibration requests, the BS may pair the UEs in proximity which are requesting calibration (1404). The BS may also allocate resources for the paired UEs (e.g., UE A and UE B are paired in this example) for a D2D based reciprocity calibration. That is, the BS may allocate resources for the paired UEs to use in exchanging reference signals for a D2D based calibration procedure. At 1406, the BS sends an indication of the pairing the allocated resources to the UEs.

The paired UEs then perform a D2D based calibration procedure using the resources allocated from the BS. For example, at 1408, UE A sends a calibration RS to its partner UE A. The calibration RS may include a SRS or another type of RS. At 1410, UE B estimates side-link channel $R_{AB}$ based on the calibration RS. At 1412, UE B sends a calibration RS (e.g., SRS) in addition to a representation of the side-link channel ($G=f(\hat{H}_{AB})$) to UE A. At 1414, UE A estimates side-link channel $H_{BA}$ based on the calibration RS from UE B. At 1416. UE A sends a representation of the side-link channel ($G=f(\hat{H}_{BA})$) to UE B. Each UE A and UE B have knowledge of the channel in both directions. Each of UE A and UE B then compute a calibration matrix (1416) and apply the calibration matrix (1418).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-h, a-a-c, a-h-h, a-c-c, b-b, b-b-b, b-b-c, c-c, and c-c-c or any other ordering of a, b, and C).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for sending, means for obtaining, and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, means for estimating, means for performing, means for determining, means for calibrating, means for mapping, means for using, means for modulating, means for pairing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10-14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for performing an over the air calibration for wireless communications by a user equipment (UE), comprising:
   sending a first reference signal (RS) to a device;
   estimating a first channel from the device to the UE based on a second RS received from the device;
   receiving, from the device, a representation of a second channel from the UE to the device determined based on the first RS; and
   performing a calibration for a transmission to the device based in part on the first channel estimate and the representation of the second channel.

2. The method of claim 1, wherein performing the calibration comprises:
   determining a calibration matrix based on the first channel estimate and the representation of the second channel;
   determining a calibrated estimate of the second channel based on the calibration matrix.

3. The method of claim 2, further comprising:
   determining a precoding to use for the transmission based on the calibrated estimate of the second channel; and
   sending the transmission to the device based on determined precoding.

4. The method of claim 1, wherein the representation of the second channel comprises a subset of an estimate of the second channel.

5. The method of claim 1, wherein the representation of the second channel comprises an estimate of a covariance matrix for the second channel.

6. The method of claim 1, wherein the representation of the second channel comprises one or more eigenvectors of an estimate of the second channel or a covariance matrix.

7. The method of claim 1, wherein the representation of the second channel comprises one or more eigenvalues of an estimate of the second channel or a covariance matrix.

8. The method of claim 1, wherein the representation of the second channel is received via a physical downlink control channel.

9. The method of claim 1, wherein the representation of the second channel is received via a physical downlink shared channel.

10. The method of claim 9, wherein the representation of the second channel is multiplexed with one or more downlink shared channel transport blocks.

11. The method of claim 1, wherein the first RS indicates a request for assistance in calibrating the transmission.

12. The method of claim 1, further comprising sending a request for assistance in calibrating the transmission.

13. The method of claim 12, wherein the request is sent to the device, and wherein the device is a base station (BS).

14. The method of claim 13, wherein the first RS comprises a sounding reference signal (SRS), and wherein the second RS comprises a channel state information (CSI) RS.

15. The method of claim 14, wherein the first channel is a downlink channel between the UE and the BS, and wherein the second channel is an uplink channel between the UE and the BS.

16. The method of claim 12, wherein the request is sent to a plurality of UEs, and wherein the device is one of the plurality of UEs.

17. The method of claim 16, further comprising receiving a response to the request from a subset of the plurality of UEs, wherein the device is within the subset of the plurality of UEs.

18. The method of claim 16, wherein the first RS and second RS comprise sounding reference signals (SRSs), and wherein the transmission comprises a device to device communication.

19. The method of claim 12, wherein the request is sent to a base station (BS), and wherein the device is a UE.

20. The method of claim 19, further comprising:
after sending the request, receiving an indication of the device and an indication of a set of resources to use for sending the first RS to the device, wherein the first RS is sent to the device on the indicated set of resources.

21. A method for performing an over the air calibration for wireless communications by a base station (BS), comprising:
receiving a first reference signal (RS) from a first user equipment (UE);
estimating an uplink channel from the first UE to the BS based on the first RS;
determining a representation of the uplink channel based on the uplink channel estimate; and
sending the representation of the uplink channel to the first UE to assist the first UE in calibrating a transmission to the BS.

22. The method of claim 21, further comprising:
sending a second RS to the first UE, wherein the first RS comprises a sounding reference signal (SRS) and the second RS comprises a channel state information reference signal (CSI-RS).

23. The method of claim 21, further comprising receiving, from the first UE, a request for assistance in calibrating the transmission.

24. The method of claim 23, further comprising:
determining a set of resources for the first UE to use for sending the request; and
sending an indication of the determined set of resources to the first UE.

25. The method of claim 21, wherein the first RS indicates a request for assistance in calibrating a transmission from the first UE.

26. The method of claim 21, wherein the representation of the uplink channel comprises a subset of the uplink channel estimate.

27. The method of claim 21, wherein the representation of the uplink channel comprises an estimate of an uplink covariance matrix.

28. The method of claim 21, wherein the representation of the uplink channel comprises one or more eigenvectors and eigenvalues of the uplink channel estimate or an estimate of an uplink covariance matrix.

29. The method of claim 21, wherein sending the representation of the uplink channel comprises:
mapping the representation of the uplink channel into a sequence of bits;
mapping the sequence of bits onto one or more symbols; and
sending each of the one or more symbols on a set of resources allocated for sending the representation of the uplink channel.

30. The method of claim 29, wherein mapping of the representation of the uplink channel to the sequence of bits comprises using at least one of an element-wise quantization or a dimension reduction representation.

31. The method of claim 21, wherein sending the representation of the uplink channel comprises modulating a set of resources allocated for sending the representation of the uplink channel with one or more coefficients of the uplink channel representation.

32. The method of claim 21, wherein the representation of the uplink channel is sent via a physical downlink control channel.

33. The method of claim 21, further comprising:
receiving, from at least a second UE and a third UE, a request for assistance in calibrating transmissions from the second and third UEs;
after receiving the requests, pairing the second and third UEs for a calibration procedure and allocating resources for the second and third UEs to use in exchanging references signals for the calibration procedure; and
sending an indication of the pairing and the allocated resources to each of the second and third UE.

34. An apparatus comprising at least one processor configured to perform the method of any of claims 1 to 33.

* * * * *